US005578835A

United States Patent [19]
Rogers et al.

[11] Patent Number: 5,578,835
[45] Date of Patent: Nov. 26, 1996

[54] STORAGE PHOSPHOR READER CALIBRATION TECHNIQUE

[75] Inventors: Michael K. Rogers, Mendon; Robert W. Apps, Rochester; Barry H. Keys, Batavia, all of N.Y.

[73] Assignee: Eastman Kodak Company, Rochester, N.Y.

[21] Appl. No.: 560,146

[22] Filed: Nov. 17, 1995

[51] Int. Cl.$^6$ ................................................. G01N 23/04
[52] U.S. Cl. ........................................... 250/587; 350/586
[58] Field of Search .................................... 250/587, 586

[56] References Cited

U.S. PATENT DOCUMENTS

4,896,222  1/1990  Fukai ........................................ 250/587
4,914,294  4/1990  Fukai et al. ............................... 250/587

*Primary Examiner*—David P. Porta
*Assistant Examiner*—Richard Hanig
*Attorney, Agent, or Firm*—William F. Noval

[57] ABSTRACT

A calibration technique for a storage phosphor reader which accomplishes the following; a) finds the leading edge of the storage phosphor being read by the reader; b) finds the front and rear edges of the storage phosphor in order to adjust the length of the line scan to the dimension of the storage phosphor in the line scan direction; c) verifies that the photodetectors of the reader are functioning; d) adjusts each photodetector signal channel to the appropriate gain; and e) generates a correction signal to correct nonuniformities of the photodetector signal output.

7 Claims, 8 Drawing Sheets

STORAGE PHOSPHOR READER CALIBRATION TECHNIQUE

FIELD OF THE INVENTION

This invention relates in general to storage phosphor imaging systems and relates more particularly to a calibration technique for a storage phosphor reader.

BACKGROUND OF THE INVENTION

U.S. Pat. No. Reissue 31,847, reissued Mar. 12, 1985, inventor Luckey, discloses a storage phosphor system in which a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a gas or diode laser. Upon stimulation, the storage phosphor releases emitted radiation of an intermediate wavelength, such as blue light, in proportion to the quantity of x-rays that were received. To produce a signal useful in electronic image processing, the storage phosphor is scanned in a raster pattern by a laser beam deflected by an oscillating or rotating scanning mirror or by a rotating hologon. The emitted radiation from the storage phosphor is reflected by a mirror light collector and detected by one or more light detectors to produce an x-ray image signal. Typically, the storage phosphor is translated in a page or slow scan direction past the laser beam which is repeatedly deflected in a line or fast scan direction perpendicular to the page or slow scan motion of the storage phosphor to form an image signal having a matrix of pixels. The x-ray image signal can then be viewed as a visual image produced on a video monitor or other display device or as a permanent image printed out on film or paper.

In storage phosphor readers it is desirable to provide high emitted light collection efficiency in order to speed up the reading of a storage phosphor and to attain maximum reader performance. There has been proposed a storage phosphor reader having a highly efficient emitted light collector system including an array of five photodetectors (photomultiplier tubes) which receive light either directly emitted from a storage phosphor or reflected by a highly efficient specularly reflective mirror light collector. In such a storage phosphor reader, there is a need to verify that all of the photodetectors are functioning, that each of the photodetector signal channels has appropriate gain, and that the output of the several photodetectors is corrected for variations in signal output across the line scan direction. More generally, there is also a need to fit the length of the scanning beam to the dimension of the storage phosphor in the line scan direction and to locate the leading edge of the storage phosphor in the page scan direction.

SUMMARY OF THE INVENTION

According to the present invention, there is provided a calibration technique for storage phosphor readers which fulfills the needs discussed above. According to a feature of the present invention, there is provided a calibration technique for a storage phosphor reader which accomplishes the following; a) finds the leading edge of the storage phosphor being read by the reader; b) finds the front and rear edges of the storage phosphor in order to adjust the length of the line scan to the dimension of the storage phosphor in the line scan direction; c) verifies that the photodetectors of the reader are functioning; d) adjusts each photodetector signal channel to the appropriate gain; and e) generates a correction signal to correct nonuniformities of the photodetector signal output.

DESCRIPTION OF THE EMBODIMENTS

Figure 1:
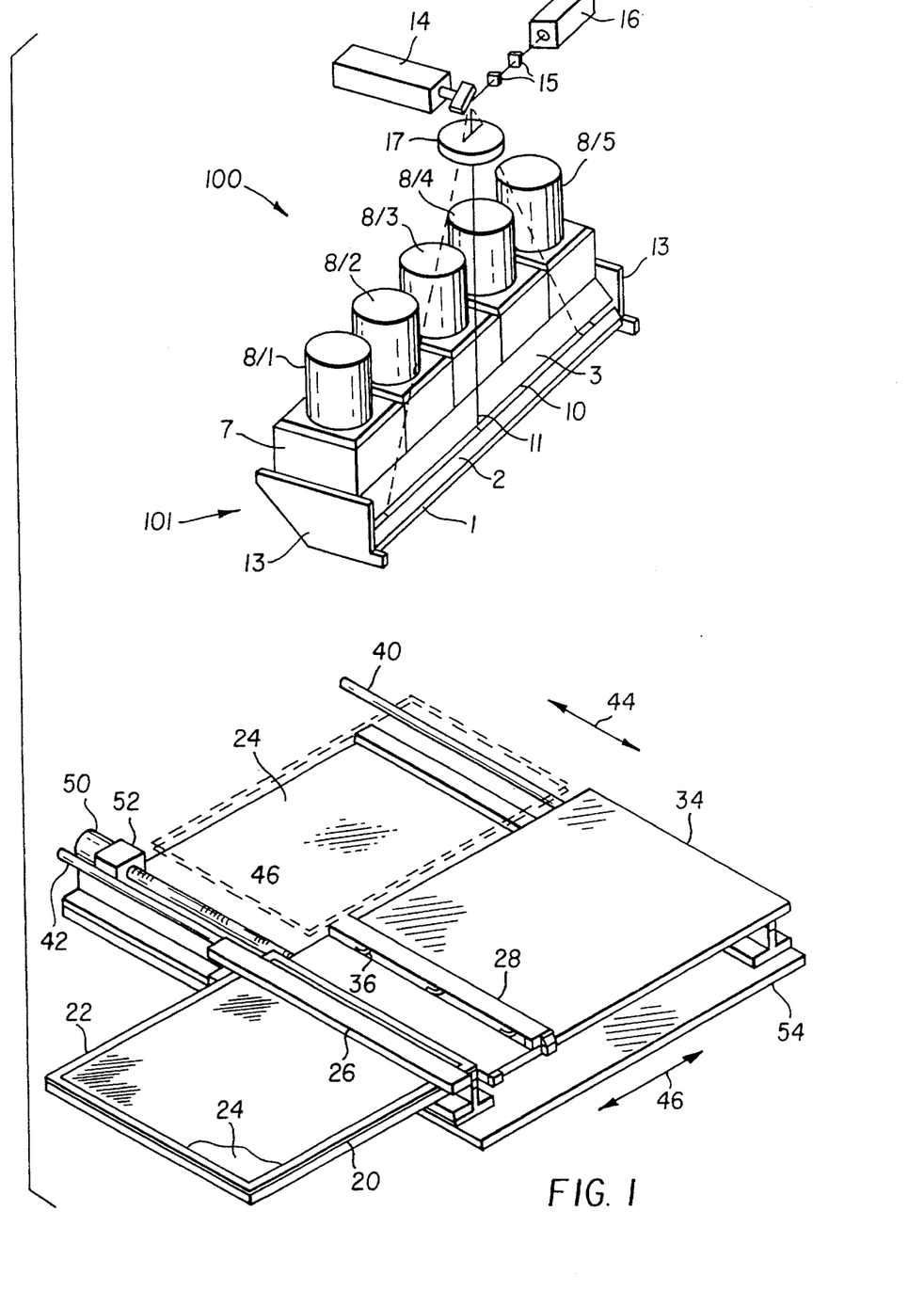
FIG. 1 is a perspective view of a storage phosphor reader in which the calibration technique of the present invention may be used.

Referring now to FIG. 1 there is shown the functional components of a storage phosphor reader which can incorporate the calibration procedure of the present invention. As shown, storage phosphor reader 100 includes a laser source 16, such as a gas or diode laser, which produces a laser beam which is shaped by beam shaping optics 15. The laser beam is then caused to be scanned in a fast or line scan direction by oscillating galvo mirror 14 onto storage phosphor plate 24, after the laser beam has passed through F-theta lens 17. The scanning laser beam then passes into the emitted light collector 101 through a first slit aperture 10 which lies between specularly reflective mirrors 2 and 3, and immediately exits collector 101 through a second slit aperture (not shown) aligned with first slit aperture 10. The laser beam is brought to focus on the storage phosphor 24 creating emitted light from a very small pixel area on the storage phosphor 24. The laser beam is scanned across storage phosphor 24 in a line scan direction as it is moved in a slow or page scan direction 44 perpendicular to the line scan direction.

The emitted light from storage phosphor 24 is directed either directly or indirectly through reflection from mirrors 1, 2, and 3 and two other mirrors not shown through the stimulating light absorption filter 7 to an array of five photodetector photomultiplier tubes (PMTs) 8. The PMTs 8 are, for example, five 3 by 3 inch square photomultiplier tubes supplied by the Burle or Hammamatsu companies.

A storage phosphor cassette 22 containing storage phosphor plate 24 is loaded on cassette loading platform 20. The cassette 22 is clamped in place by load lever 26. Storage phosphor plate 24 is extracted from cassette 22 by extraction device 28. Extraction device 28 is slidably mounted on translation stage 34 and includes hooks 36 which engage storage phosphor plate 24 to move it onto stage 34.

Translation stage 34 is slidably mounted on rails 40 and 42 for movement in direction 44 (slow or page scan direction). Direction 44 is perpendicular to the directions 46 of loading and unloading plate 24. Stage 34 is driven by a screw drive mechanism 48 actuated by or servo stepper motor 50 mounted on block 52. Rails 40 and 42 are supported by frame member 54 of reader 100.

Once a storage phosphor plate 24 is on translation stage 34 a scan is begun. Translation stage 34 is moved in the direction of arrow 44 (to the left) and galvo 14 scans the laser beam repetitively in the line scan direction for the appropriate number of line scans as determined by the plate size. The stage 34 is then reversed to bring plate 24 back to the starting position. Any residual image on plate 24 is then erased, and plate 24 is returned to cassette 22 by mechanism 28.

Figure 2:
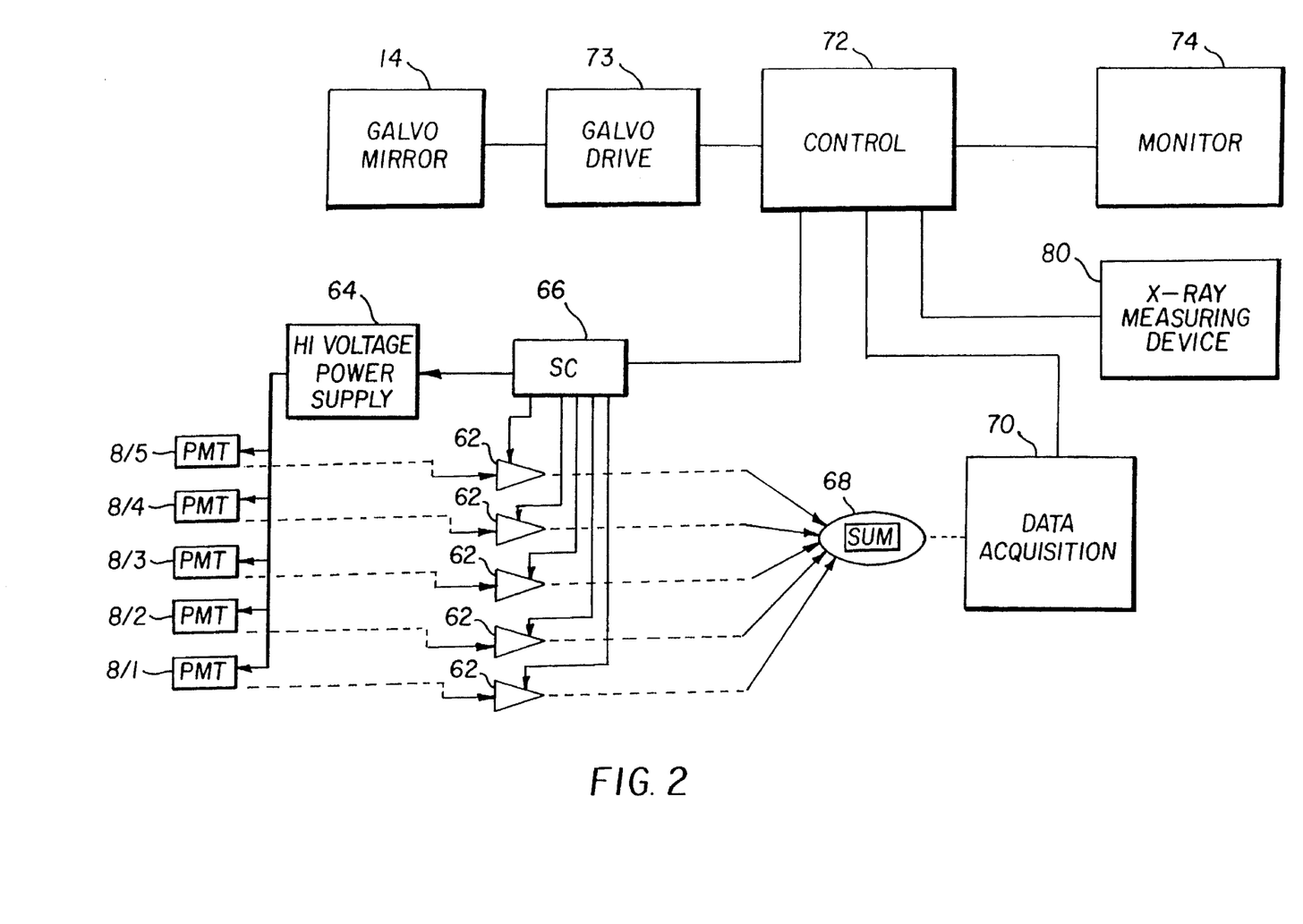
FIG. 2 is a block and diagrammatic view of a control and operation circuit for the reader of FIG. 1.

Referring to FIG. 2, there is shown operation and control circuit 60 for reader 100. During the scan of storage phosphor plate 24, the emitted light is converted by PMTs 8 to electrical currents which are converted to voltages by preamplifiers 62. PMTs 8 are supplied high voltages by high voltage power supply 64 which, for example, can supply 0–1000 volts. The gain (e.g., 0–2×) of preamplifiers 62 is controlled by control signals from servo and sequence control circuit 66. The voltage outputs from preamplifiers 62 are summed in sum circuit 68. The output analog voltage from sum circuit 68 is converted to a digital signal in data acquisition circuit 70. The digital signal is supplied to control 72. A touch screen monitor 74 serves to display the x-ray image signal from control circuit 72 and to receive touch actuated control commands and data from an operator. Control 72 also controls the operation of galvo 14, through galvo drive circuit 73.

As discussed above, according to the present invention, there is provided a procedure for the calibration of reader 100 to establish the image collection parameters of the reader (i.e., to establish parameters that will yield a square pixel when storage phosphor plates are scanned). In general, the procedure accomplishes the following:

a) finds the leading edge of storage phosphor plate 24;

b) finds the front and rear edges of plate 24, by adjusting the offset and amplitude of the galvo mirror, thus fitting the line scan of the laser beam to the dimension of plate 24;

c) verifies that the PMTs 8 are functioning;

d) adjusts the gain of the signal channel of each PMT 8 to an appropriate gain value; and e) generates a collector profile correction signal to assure uniformity of the signal across the line scan.

Each of these steps will now be discussed in greater detail. A storage phosphor plate 24 of a given size is first exposed to a uniform x-ray exposure. (The calibration procedure must be performed for each size plate to be used.) The flat field exposure for an exemplary reader, must be between 10–30 units of dose per plate based on an internal dosimeter reading (this exposure value is used also to set the PMT high voltage gain). The uniformly exposed plate 24 is then loaded into reader 100.

Initially, the galvo mirror 14 is set to overscan the plate 24. This ensures that the leading (top edge of the plate 24 when moving in the slow scan direction 44), front ("left"), and rear ("right") edges will be found. The offset or starting point of the galvo is set to a low value and the amplitude or angle of scan of the galvo is set to a high value so that the pixel shape will be rectangular. Throughout this process, the number of pixels to be scanned in a line direction remains fixed (e.g., 2048 pixels).

The first step of the calibration procedure is to find the leading edge of plate 24. Plate 24 is scanned by the laser beam. The resulting signal value for a selected set of pixels is tested to determine when their average exceeds a predetermined value (e.g., 2000 code values). This is illustrated in region 1 of FIG. 3 and in the graphical diagram of signal value vs. line scan pixel position shown in FIG. 4. When the average has exceeded the predetermined value, the leading edge of the plate 24 has been found.

If the average code values for all the PMTs are between 100 and 1500 cv, for example, then the plate has a low exposure. If the code values are below 100, then the plate 24 was not exposed or the high voltage was not connected to PMTs 8.

Figure 4:
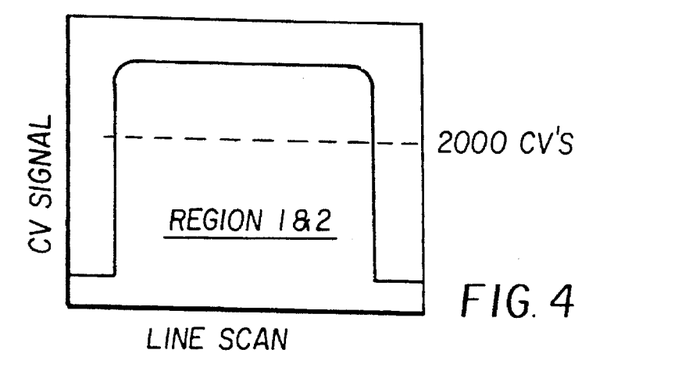
FIGS. 4–15 are graphical views useful in explaining the present invention.
Figure 5:
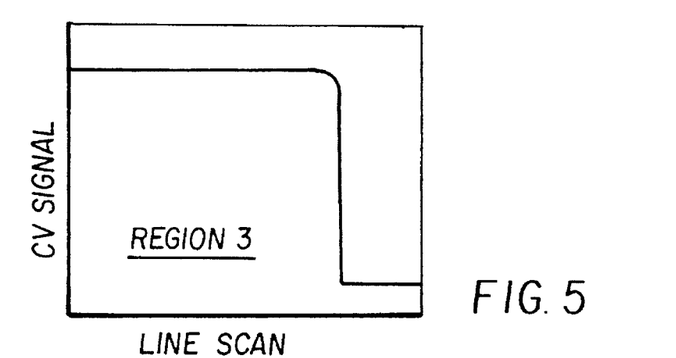
Figure 6:
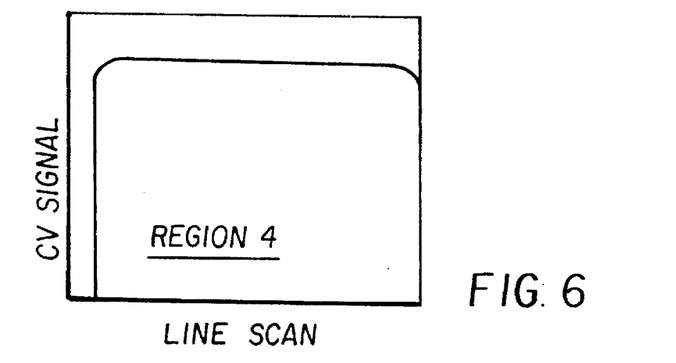

The next step of the calibration procedure is to find the front and rear edges of the plate 24 by adjusting the amplitude and offset of galvo mirror 14. As shown in region 2 of FIG. 3 and in FIG. 4, plate 24 is continually overscanned in the fast or line scan direction. The salvo mirror offset is gradually increased (i.e., the galvo mirror 14 starting position is adjusted so that the laser beam starts at a higher position on plate 24) until there is no drop off in code values of the image signal (below 2000 cv), thus indicating that the front edge is found. (See FIG. 5 and region 3 of FIG. 3). The offset of galvo mirror 14 is now set at the front edge and the amplitude is decreased until the rear edge is found (again, this is determined by no drop off in code values). This is illustrated in region 4 of FIG. 3 and in FIG. 6. By decreasing the amplitude the velocity is also decreased which widens the pixels to an appropriate shape (i.e., the aspect ratio is preserved at less than or equal to 1%).

Figure 16:
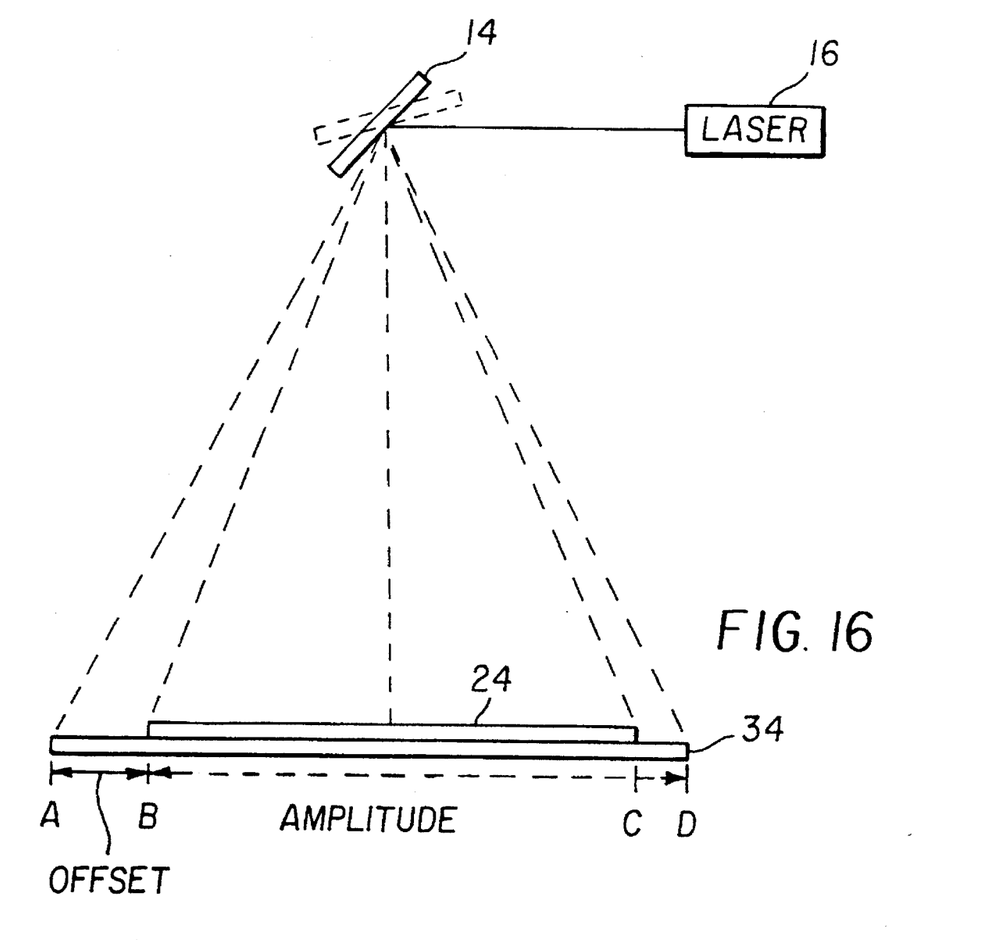
FIG. 16 is a diagrammatic view useful in explaining the present invention.

This step is further illustrated in FIG. 16. As shown, the beam from laser 16 is scanned by galvo mirror 14 onto storage phosphor plate 24. During the operation to find the front edge B of plate 24 the offset of mirror 14 is moved so that the laser beam is moved from point A to point B. The rotation of mirror 14 is then set so that each scan starts at point B. During the operation to find the rear edge C of plate 24, the amplitude of mirror 14 is decreased so that the laser beam is moved from point D to point C. The mirror 14 is then set so that each scan ends at point C.

Figure 3:
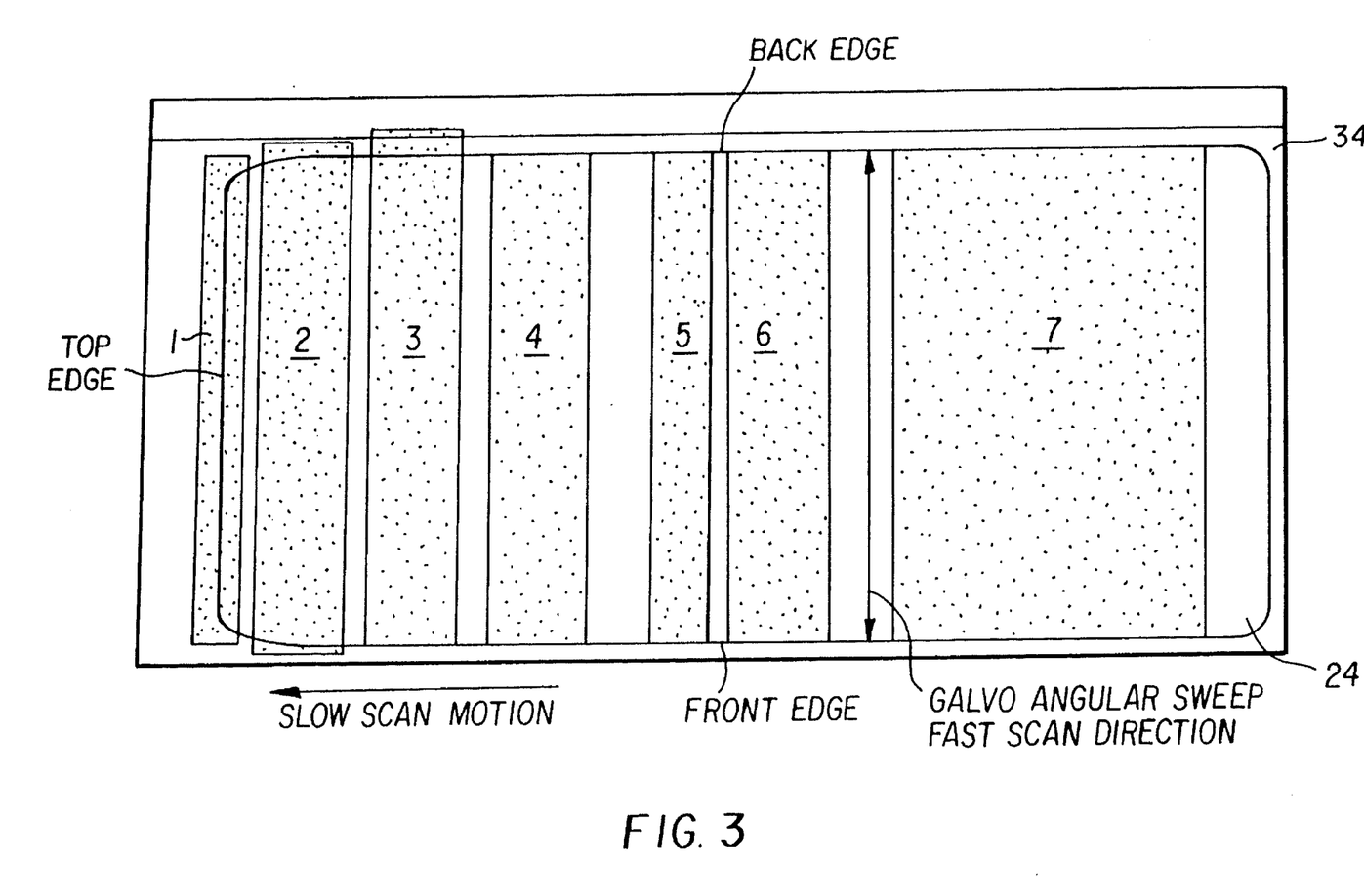
FIG. 3 is a diagrammatic view useful in illustrating the calibration technique of the present invention.
Figure 7:
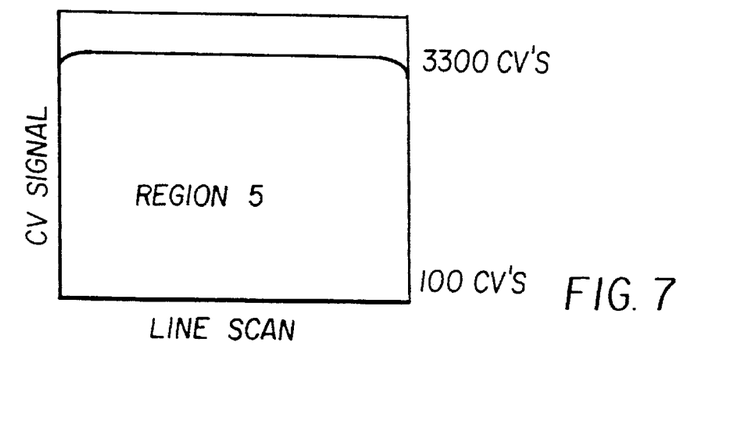
Figure 8:
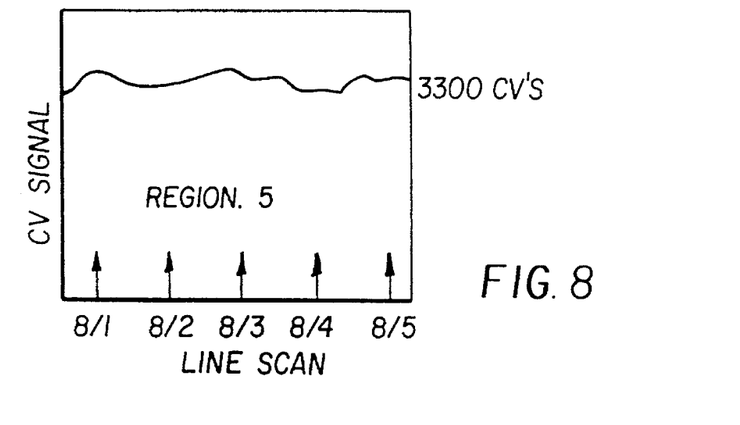
Figure 9:
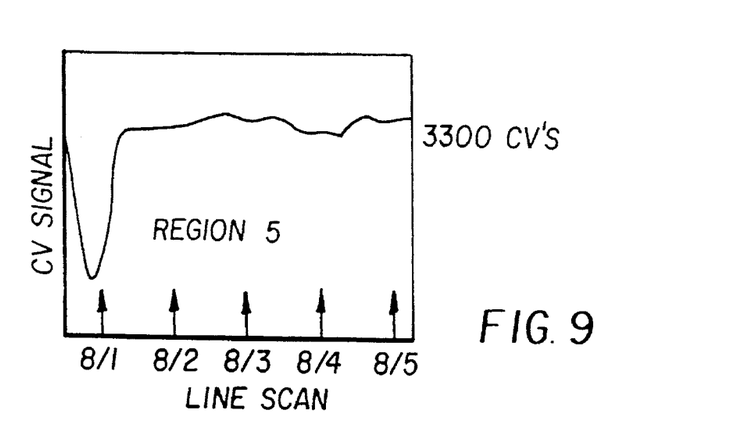
Figure 10:
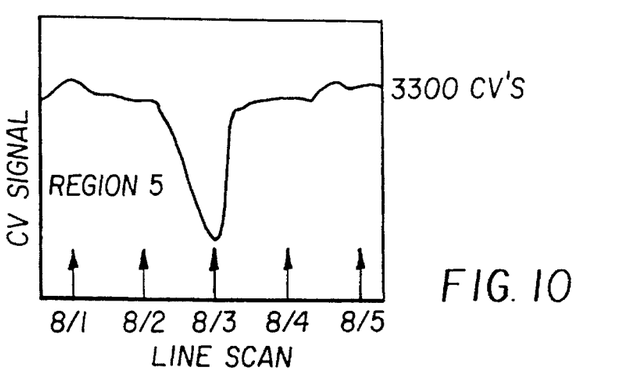
Figure 11:
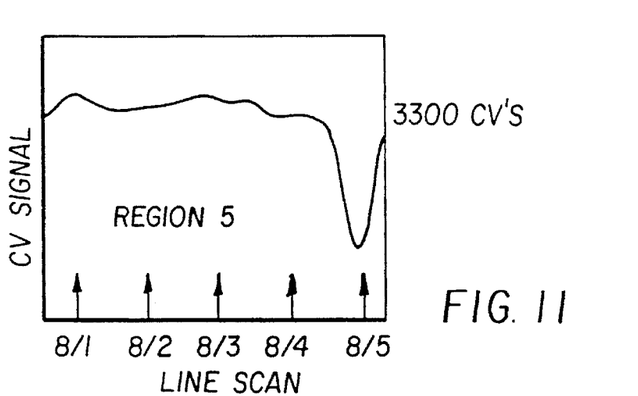

The third step of the calibration procedure is to verify that PMTs 8 are functioning. Initially, PMTs 8 are set up as if no collector profile correction signal has been determined. Thus, the PMT high voltage is set, e.g., to −500 volts and each PMT 8 signal channel has its gain set to the highest possible setting for that particular plate size. Each PMT 8 is tested to determine whether it is operating. Start with all five PMTs on and take a baseline reading. The gain for each PMT signal channel is set at 1× (See: FIG. 3, region 5, FIGS. 7 and 8). PMT 8/1 is turned off by setting the channel gain to 0 and the output signal is checked to determine if there is a drop in signal code value under PMT 8/1. If no drop occurs, the PMT 8/1 channel is not working. If, as shown in FIG. 9, there is a drop in signal code value, then the PMT is assumed to be functioning properly. The procedure is repeated for the other four PMTs 8/2–8/5 (See: FIGS. 10 and 11 illustrating the cases where PMT 8/3 and PMT 8/5, respectively, are determined to be functioning).

Figure 12:
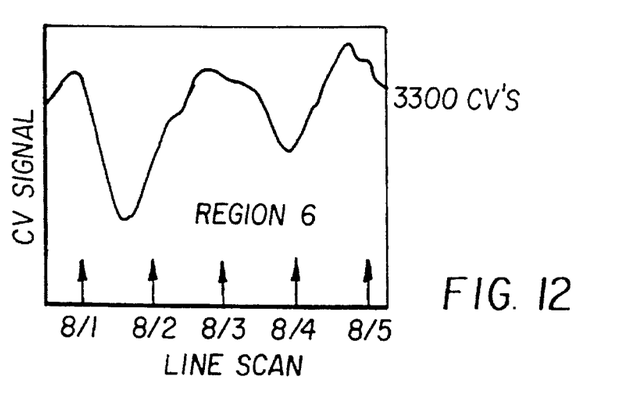
Figure 13:
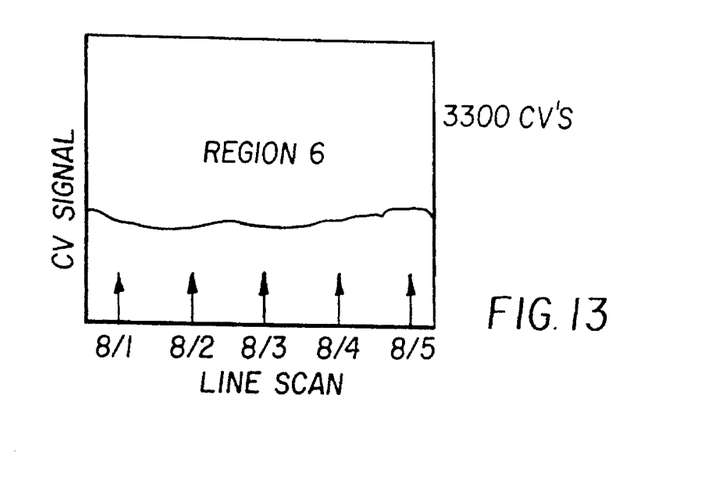
Figure 14:
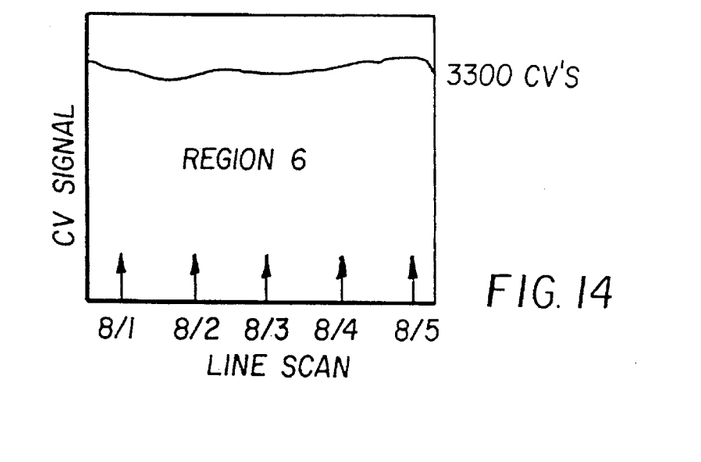
Figure 15:
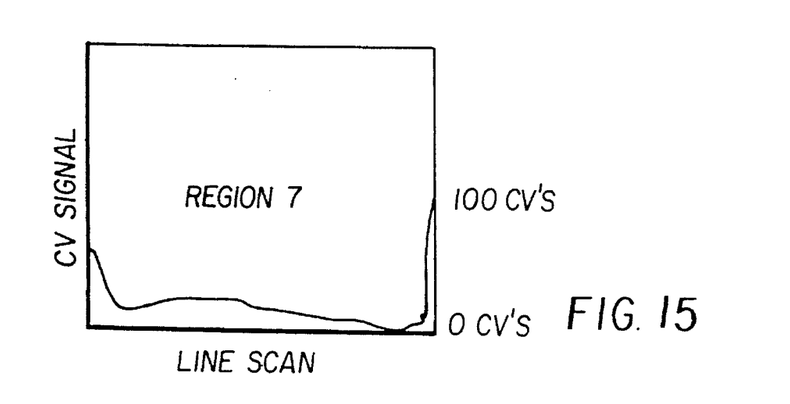

The next step of the calibration procedure is to adjust each PMT 8 signal channel to the appropriate gain (See: FIG. 3, region 6, FIGS. 12–14). With all of the PMT 8 channel gains set to 1×, the fast scan slice is checked for the lowest amplitude reading. As shown in FIG. 12, for this example, PMT 8/2 channel has the lowest reading. The other PMT 8 channel gains are now lowered by adjusting the gain of the respective preamplifier 62 (FIG. 2) to even out the peaks to within 10 code values (FIG. 13). Now the PMT High Voltage reference voltage is adjusted up for each PMT 8 (FIG. 2, HV Power Supply 64) to calibrate it to the known exposure setting (See: FIG. 14). For example, 20.2 units of x-ray dose read from the dosimeter=3305 code values.

The last step of the calibration procedure is to determine the fast scan or collector fine adjustment correction signal in order to counterbalance the peaks and valleys still remaining in the PMT 8 gains, thereby effectively eliminating the peaks. The residual signal is inverted and stored in memory as the collector profile correction signal. This correction signal will be added on to the output signal during the actual scan of a storage phosphor plate.

Although the invention has been described above with reference to specific embodiments, it will be understood that modifications and variations can be made within the scope of the invention. Thus, although five PMTs have been described, it will be understood that the calibration technique of the present invention is applicable to readers using more or less than five PMTs. Photodetectors other than PMTs can also be used.

What is claimed is:

1. In a storage phosphor reader including a source of a beam of stimulating light, an oscillating mirror for repetitively scanning said beam of stimulating light in a line scan direction across a storage phosphor moved in a page scanning direction past said beam of light, and a plurality of photodetectors arrayed in a line scanning direction for converting light emitted by a scanned storage phosphor into an electrical image signal, the method of calibrating said storage phosphor reader comprising the steps of:

moving a storage phosphor which has been exposed to a uniform field of x-ray radiation in a page scan direction past said line scanning beam of stimulating light;

measuring the signal produced by said plurality of photodetectors to determine the leading edge of the storage phosphor as taken in the page scan direction;

while overscanning the storage phosphor in a line scan direction, measuring the signal produced by said plurality of photodetectors to determine the front and rear edges of said storage phosphor and from said measurements, setting the start and end points of the oscillation of said mirror so that the traverse of said stimulating light on said storage phosphor begins at said front edge and ends at said rear edge;

thereafter, measuring the signal produced by each of said plurality of photodetectors to determine whether each is operating;

adjusting the signal channel of each of said plurality of photodetectors so that the signal produced by said plurality of photodetectors is substantially uniform across a line scan; and determining a collector profile correction signal to be added to each line scan of a storage phosphor read by said reader.

2. The method of claim 1 wherein in said first measuring step, said leading edge of said storage phosphor is determined by measuring and averaging the signal value of a preselected number of pixels of a line scan and determining the leading edge when said average signal value exceeds a predetermined value.

3. The method of claim 1 wherein in said second measuring step, said front edge of said storage phosphor is determined by gradually increasing the offset of said oscillating mirror until there is no drop off in the signal value measured at the beginning of a line scan and setting the starting point of the oscillation of said mirror.

4. The method of claim 3 wherein in said second measuring step, said rear edge of said storage phosphor is determined by decreasing the amplitude of said oscillating mirror until there is no dropoff in the signal value measured at the end of a line scan and setting the end point of the oscillation of said mirror.

5. The method of claim 1 wherein in said third measuring step, the combined signal output of said plurality of photodetectors is measured and taken as a baseline reading, each photodetector channel is in turn set to zero, the combined signal is measured to determine if there is a drop in signal value, and, if there is a drop, determining that the respective photodetector is functioning, but if there is no drop, determining that the respective photodetector is not functioning.

6. The method of claim 1 wherein said adjusting step includes the steps of setting the gain of each photodetector signal channel to the same predetermined value, determining the lowest photodetector signal value, adjusting the gain of each of the other photodetector signal channels until the signal values of each said other channel is substantially equal to said determined lowest signal value, and adjusting the high voltage for each photodetector to calibrate it to a known x-ray exposure setting to produce a substantially uniform line scan output signal.

7. The method of claim 6 wherein said determining step includes inverting the residual of said substantially uniform line scan output signal and storing it as a collector profile correction signal to be added to each line scan of a storage phosphor read by said reader.

\* \* \* \* \*